June 10, 1958    L V HENRY    2,837,922
ANTI-FREEZE GAUGE FOR AUTOMOBILE MOTORS
Filed Oct. 23, 1956

INVENTOR.
L. V. Henry
BY
Murray, Sackhoff & Murray
ATT'YS

United States Patent Office 2,837,922
Patented June 10, 1958

---

2,837,922

ANTI-FREEZE GAUGE FOR AUTOMOBILE MOTORS

L V Henry, Reading, Ohio

Application October 23, 1956, Serial No. 617,738

1 Claim. (Cl. 73—453)

The present invention relates to improvements in anti-freeze gauges for the cooling systems of automobile motors and is particularly directed to a permanently installed, continuously operated means for securing accurate specific gravity readings of the coolant for automobile motors.

It is well known that the rate of flow of fluid in the cooling system of an automobile motor is directly proportional to the number of revolutions per minute of the main power shaft because the coolant pump is driven by a power take-off means connected to said shaft. Thus at high motor speeds the rate of flow of the coolant is quite high and causes considerable turbulence of the coolant in the system or in reservoirs connected thereto. The anti-freeze gauge of the present invention has a closed, fluid tight casing connected to the cooling system and an object of the invention is to provide an improved means for shielding the gauge float from the turbulent coolant flowing therethrough, whilst securing intimate contact between the coolant and the exterior surface of the float whereby accurate readings can be obtained by the gauge.

Another object of this invention is to provide a rheostat and float structure in a gauge having the foregoing characteristics to secure improved measuring and recording features.

With the foregoing and other objects in view my invention consists in certain novel features of construction and arrangements of parts that will be illustrated in the accompanying drawing, in which.

Figures 1, 3:
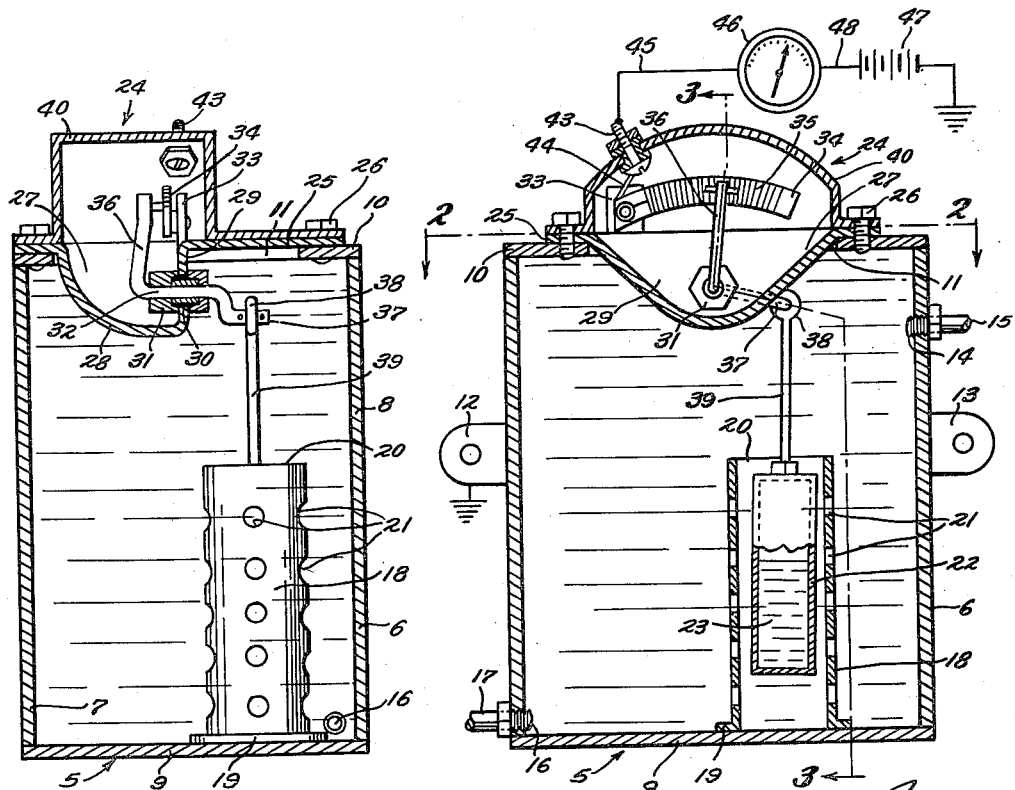
Fig. 1 is a sectional view taken through the center of my gauge, parts thereof being shown diagrammatically.
Fig. 3 is a section taken on line 3—3 of Fig. 1.
Figure 2:
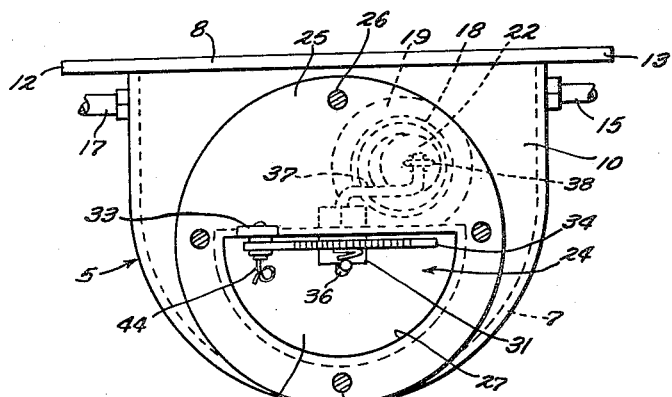
Fig. 2 is a section taken on line 2—2 of Fig. 1.

Referring to the accompanying drawing the numeral 5 designates a hollow casing with a tubular side wall 6 having a partly curved front part 7 and flat rear part 8. An imperforate bottom wall 9 is provided for the casing, and the upper end of the side wall is closed with a top wall 10 that has an opening 11 formed therethough. Perforate ears 12 and 13 project from opposite sides of the rear part 8 of the side wall for bolting the container to a suitable support in proximity to the motor of an automobile. A liquid inlet 14 is provided in the upper portion of the front part 7 of the container side wall for connection with a pipe 15 leading to the pump pressure side of the cooling system for the motor whilst an outlet 16 is formed in the lower portion of the container side wall for connection with a pipe 17 leading to the pump return side of the cooling system.

An upstanding tube 18 is mounted upon the bottom 9 of the container, said tube having an outwardly flaring flange 19 formed on its bottom end portion which is fixed, as by welding, to the said bottom wall. The tube has an open top end 20 and is provided with a number of perforations 21 so that liquid may circulate through the tube and come in intimate contact with an hydrometer or float 22 that comprises a hollow, fluid tight shell containing a substance 23 such as linseed oil. This substance will compensate for temperature variations in the liquid surrounding the float to continuously give an accurate buoyant force to the float for all temperatures of the surrounding liquid.

The top wall 10 of the container carries a rheostat generally indicated by the numeral 24, said rheostat comprising a circular plate 25 overlapping the hole 11 in the top wall and secured thereto by suitable bolts 26, said plate having a recess 27 formed centrally thereof which depends into the interior of the container. The recess is formed with a semicircular side wall portion 28 and a planar vertical wall portion 29, the latter having a hole 30 formed through its central portion to receive a graphite packed bearing 31 that has a hole therethrough for rotatably mounting a shaft 32. An upstanding ear 33 is mounted on the plate adjacent the vertical wall portion 29 and has mounted thereon a strip 34 of electrical insulating material that has wrapped thereon a grid element 35. One end of an arm 36 is secured to the shaft 32 and has its free end in contact with and adapted to move across the grid element 35. The opposite end of the shaft 32 extends into the interior of the container and has a crank arm 37 formed thereon which pivotally engages an eye 38 formed in the upper end of a link 39 that is anchored at its lower end in the float 22.

A dome shaped cover 40 is removably secured to the plate 25 by means of a flange 41 that is secured to the plate 25 by the bolts 26. This cover has a terminal bolt 43 fixed therein which is connected by a wire 44 to one side of the rheostat grid element 35. The terminal element is connected by a wire 45 to an ammeter 46 preferably mounted on the dash of the vehicle whilst the opposite side of the ammeter is connected to a battery 47 by a wire 48. Thus movement of the arm 36 across the grid element 35 will cause a variation in the electric circuit including the rheostat, the ammeter and the battery which will vary the reading on the ammeter dial.

From the foregoing it is evident that the perforate guide tube for the float will shield the float from the turbulent ffect of the coolant passing through the container but will permit sufficient coolant to come in contact with the exterior surface of the float to give an accurate reading on the ammeter dial with respect to the anti-freezing characteristic of the coolant at any given time. Further the rheostat gauge structure is extremely simplified and has an operating mechanism well adapted for actuation by a float means acting vertically through a guide tube.

What is claimed is:

In an anti-freeze gauge for motor vehicles, a hollow liquid container comprising a tubular side wall having a curved front part and a flat rear part, a bottom wall and a top wall for the container, said top wall having an opening therethrough, container mounting means fixed to the rear wall, a fluid inlet formed in the upper portion of the front part of the side wall, a fluid outlet opening formed in the lower portion of said wall, a casing having a plate overlapping the mouth of the opening, liquid tight means for securing the plate to the container, a recess formed in the plate, said recess having a flat wall portion, a rheostat element mounted on the plate above the flat wall portion on the casing, a packing gland fixed in and extending through the said flat wall portion, a shaft extending through the gland, an arm secured to the shaft and having a free end slidably engaging the rheostat element, a crank arm formed on the opposed end of the shaft extending into the interior of the container, an open topped, perforate guide tube mounted upon the bottom of the container, a cylindrical float of smaller diameter than the inside of said guide tube vertically freely movable within the guide tube, and an arm fixed to the upper end of the float and having its upper end pivotally connected to the crank arm.

References Cited in the file of this patent

UNITED STATES PATENTS

| | | |
|---|---|---|
| 2,002,184 | Lecarpentier | May 21, 1935 |
| 2,147,500 | Rothenberger | Feb. 14, 1939 |
| 2,235,064 | Cloud | Mar. 18, 1941 |
| 2,266,298 | Bacon | Dec. 16, 1941 |
| 2,434,425 | Muller | Jan. 13, 1948 |
| 2,728,838 | Vick Roy | Nov. 8, 1955 |